(12) United States Patent
Potts et al.

(10) Patent No.: US 12,572,605 B1
(45) Date of Patent: Mar. 10, 2026

(54) SYSTEMS AND METHODS FOR DOCUMENT TRACKING

(71) Applicant: JPMORGAN CHASE BANK, N.A., New York, NY (US)

(72) Inventors: Joel Potts, London (GB); Suresh Devanahally, Monroe Township, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/538,867

(22) Filed: Dec. 13, 2023

(51) Int. Cl.
*G06F 7/00* (2006.01)
*G06F 16/93* (2019.01)

(52) U.S. Cl.
CPC .................................... *G06F 16/93* (2019.01)

(58) Field of Classification Search
CPC ........................................ G06F 16/93
USPC ................................................ 707/600–899
See application file for complete search history.

(56) References Cited

U.S. PATENT DOCUMENTS

2009/0024609 A1*  1/2009  Barker ................ G06F 16/9577
                                              707/999.005
2018/0246888 A1*  8/2018  Zholudev ................ H04L 67/02

* cited by examiner

*Primary Examiner* — Isaac M Woo
(74) *Attorney, Agent, or Firm* — GREENBERG TRAURIG LLP

(57) ABSTRACT

Systems and methods for document tracking are disclosed. In one embodiment, a method for document tracking may include: (1) generating, by a document tracking computer program, a unique document identifier for the document; (2) embedding, by the document tracking computer program, the unique document identifier into the document; (3) saving, by the document tracking computer program, an association between the unique document identifier and the document; (4) receiving, from an accessing computer program executed by a user device and by the document tracking computer program, the unique document identifier, an access timestamp, and a document property for the document; and (5) storing, by the document tracking computer program, the access timestamp and the document property in a document access database.

16 Claims, 3 Drawing Sheets

SYSTEMS AND METHODS FOR DOCUMENT TRACKING

BACKGROUND OF THE INVENTION

1. Field of the Invention

Embodiments generally relate to systems and methods for document tracking.

2. Description of the Related Art

Document management is important for any organization. Even with a document management system that controls access to documents, users still copy document and save them to their local storage. This can create confusion regarding the latest copy of the document and makes learning the document lineage difficult.

SUMMARY OF THE INVENTION

Systems and methods for document tracking are disclosed. In one embodiment, a method for document tracking may include: (1) generating, by a document tracking computer program, a unique document identifier for the document; (2) embedding, by the document tracking computer program, the unique document identifier into the document; (3) saving, by the document tracking computer program, an association between the unique document identifier and the document; (4) receiving, from an accessing computer program executed by a user device and by the document tracking computer program, the unique document identifier, an access timestamp, and a document property for the document; and (5) storing, by the document tracking computer program, the access timestamp and the document property in a document access database.

In one embodiment, the unique document identifier may include a hash of an identifier for a source electronic device, a user identifier for an author of the document, and/or a document creation timestamp.

In one embodiment, the document property may include a document title, a number of pages, a number of slides, and/or a number of sheets.

In one embodiment, the document tracking computer program saves an initial document property with the unique document identifier.

In one embodiment, the accessing computer program may include a word processing program, a presentation computer program, an electronic mail computer program, and/or a spreadsheet computer program.

In one embodiment, the document may be stored in local storage of a user electronic device.

In one embodiment, the method may also include: receiving, from a plurality of accessing computer programs in an editing chain for the document and by the document tracking computer program, access timestamps and document properties for the unique document identifier; and identifying, by the document tracking computer program, changes between the document properties.

In one embodiment, the method may also include identifying, by the document tracking computer program, an inefficiency in editing chain based on changes.

In one embodiment, the method may also include: identifying, by the document tracking computer program, a plurality of user electronic devices that have accessed local copies of the document with the unique document identifier;

and replacing, by the document tracking computer program, local copies of the document with a pointer to the document in a document repository.

In one embodiment, the accessing computer program may include a plugin or a script that identifies the unique document identifier in the document and communicates the unique document identifier, the access timestamp, and the document property to the document tracking computer program.

According to another embodiment, a system may include: a plurality of user electronic devices each executing an accessing computer program; a document access database; and an electronic device accessing a document tracking computer program that is in communication with the user electronic devices, wherein the document tracking computer program may be configured to generate a unique document identifier for a document, to embed the unique document identifier into the document, to save an association between the unique document identifier and the document in the document access database, to receive, from one of the accessing computer programs, the unique document identifier, an access timestamp, and a document property for the document, and to store the access timestamp and the document property in the document access database.

In one embodiment, the unique document identifier may include a hash of an identifier for a source electronic device, a user identifier for an author of the document, and/or a document creation timestamp.

In one embodiment, the document property may include a document title, a number of pages, a number of slides, and/or a number of sheets.

In one embodiment, the document tracking computer program saves an initial document property with the unique document identifier.

In one embodiment, the accessing computer program may include a word processing program, a presentation computer program, an electronic mail computer program, and/or a spreadsheet computer program.

In one embodiment, the document may be stored in local storage of the user electronic device.

In one embodiment, the document tracking computer program may be further configured to receive, from a plurality of accessing computer programs in an editing chain for the document, access timestamps and document properties for the unique document identifier, and to identify changes between the document properties.

In one embodiment, the document tracking computer program may be further configured to identify an inefficiency in editing chain based on changes.

In one embodiment, the document tracking computer program may be further configured to identify a plurality of user electronic devices that have accessed local copies of the document with the unique document identifier, and to replace local copies of the document with a pointer to the document in a document repository.

In one embodiment, the accessing computer program may include a plugin or a script that identifies the unique document identifier in the document and communicates the unique document identifier, the access timestamp, and the document property to the document tracking computer program.

BRIEF DESCRIPTION OF THE DRAWINGS

In order to facilitate a fuller understanding of the present invention, reference is now made to the attached drawings.

The drawings should not be construed as limiting the present invention but are intended only to illustrate different aspects and embodiments.

DETAILED DESCRIPTION OF PREFERRED EMBODIMENTS

Embodiments generally relate to systems and methods for document tracking.

Figure 1:
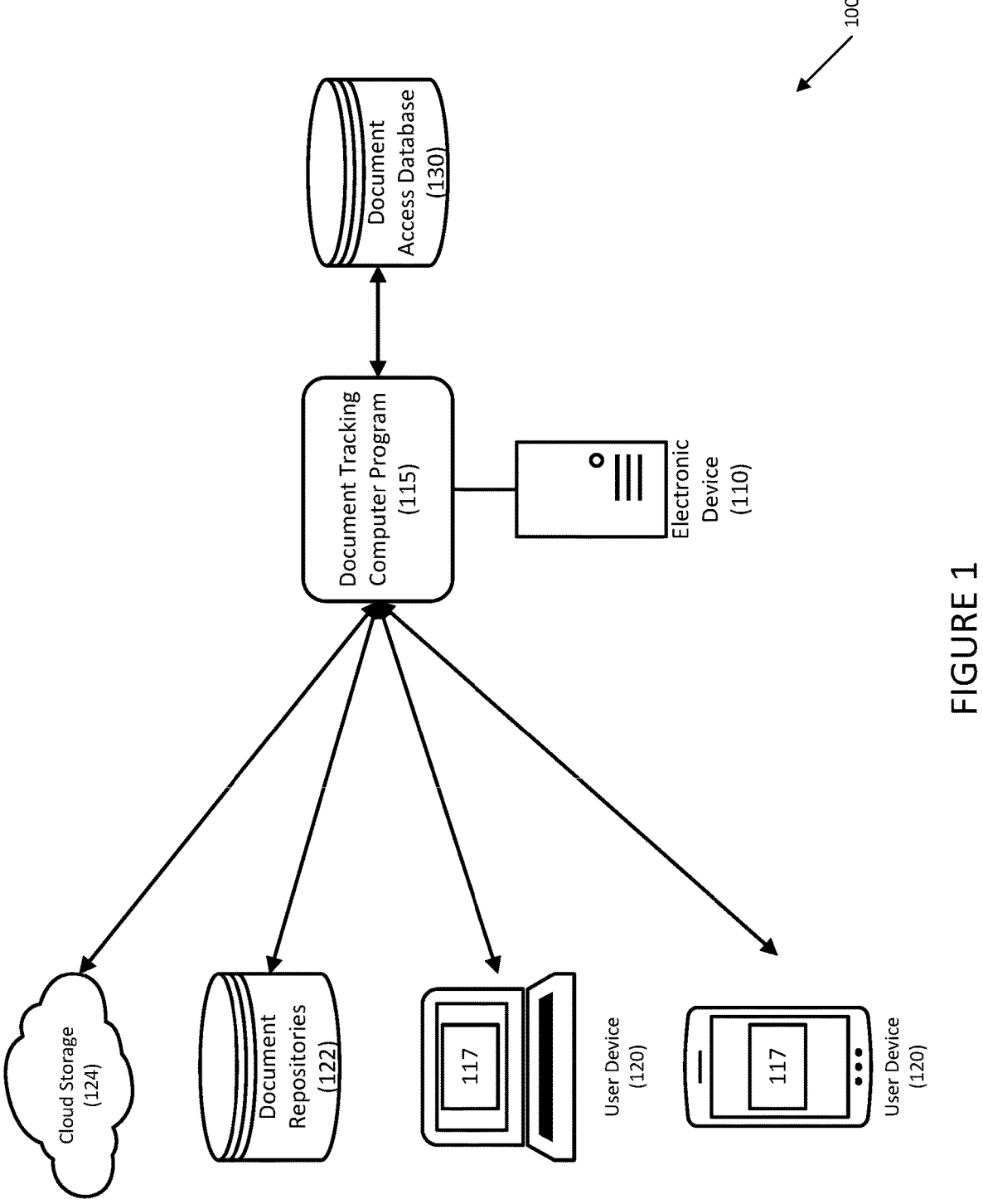
FIG. 1 depicts a system for document tracking according an embodiment.

FIG. 1 depicts a system for document tracking according to an embodiment. For example, system 100 may include electronic device 110, which may be any suitable electronic device, including servers (e.g., physical and/or cloud-based), computers (e.g., workstations, desktops, notebooks, tablets, etc.), smart devices, Internet of Things (IoT) appliances, etc. Electronic device 110 may execute computer program 115, such as tag management computer program, that may manage tags, such as unique document identifiers, associated with documents (e.g., word processing document, spreadsheets, presentations, photos, videos, audio files, computer programs, etc.). In one embodiment, computer program 115 may interface with document repositories 122, cloud storage 124, and user devices 120 within a computer network to search for and identify documents based on their unique document identifiers.

In one embodiment, user devices 120 may execute a local version 117 of document tracking computer program 115 that may generate unique document identifiers for documents and may associate the unique document identifiers with the documents.

In one embodiment, the unique document identifiers may be unique alphanumerical values. In one embodiment, the unique document identifiers may be based on one or more of a source device identifier (e.g., a unique identifier for user device 120 on which the document was created), an author identifier (e.g., the user identifier for the user that authored or created the document, a timestamp associated with the document creation, etc. In one embodiment, the unique document identifier may a hash of any of these components.

The unique document identifier may be encrypted, such as with a public key associated with document tracking computer program 115. Document tracking computer program 115 may maintain the private key associated with the public key.

In one embodiment, the unique document identifier may be inserted into a header of the document, or it may be inserted as a digital watermark.

User devices 120 may execute an accessing computer program (not shown) that may access the documents. Examples of accessing computer programs may include word processing programs, email programs, presentation programs, spread sheet program, photo editors, web browsers, etc. In one embodiment, the accessing computer programs may include code, such as a plugin, an agent, a script, etc. that may monitor document accesses. The accessing computer program may identify the unique document identifier for a document as it is accessed and may communicate access information for the document. For example, the accessing computer program may communicate the unique document identifier, access information (e.g., the user identifier for the user accessing the document, a timestamp for the access, etc.), document information (e.g., the title of the document, a number of pages/slides/sheets in document, any codes in the document (e.g., author codes, codes associated with automated content insertion, etc.).

Document tracking computer program 115 may receive the communications from the accessing computer programs on electronic devices 120, document repositories 122, etc. and may store the document information, access information, etc. with the unique document identifier in document access database 130.

Notably, embodiments may track accesses to documents that occur independent of document repositories 122. For example, documents may be accessed from emails, from local drives, from portable storage, etc., and document tracking computer program 115 may centrally store the information on the access.

Document tracking computer program 115 may also provide analytics and/or insights for documents and/or users based on the unique document identifiers. For example, document tracking computer program 115 may trace the lineage of a document across multiple branches, and may provide a history and/or family of documents that may be based on a unique document identifier even though the documents may have their own unique document identifiers. Document tracking computer program 115 may identity users that may have copies of a document associated with a unique document identifier in local storage, in email storage, etc. and may identify any recent uses of the documents. Document tracking computer program 115 may identify changes to a document associated with a unique document identifier as it moves from one user to the next, and may identify inefficiencies in editing/revising the document. Other analytics and insights may be provided as is necessary and/or desired.

Figure 2:
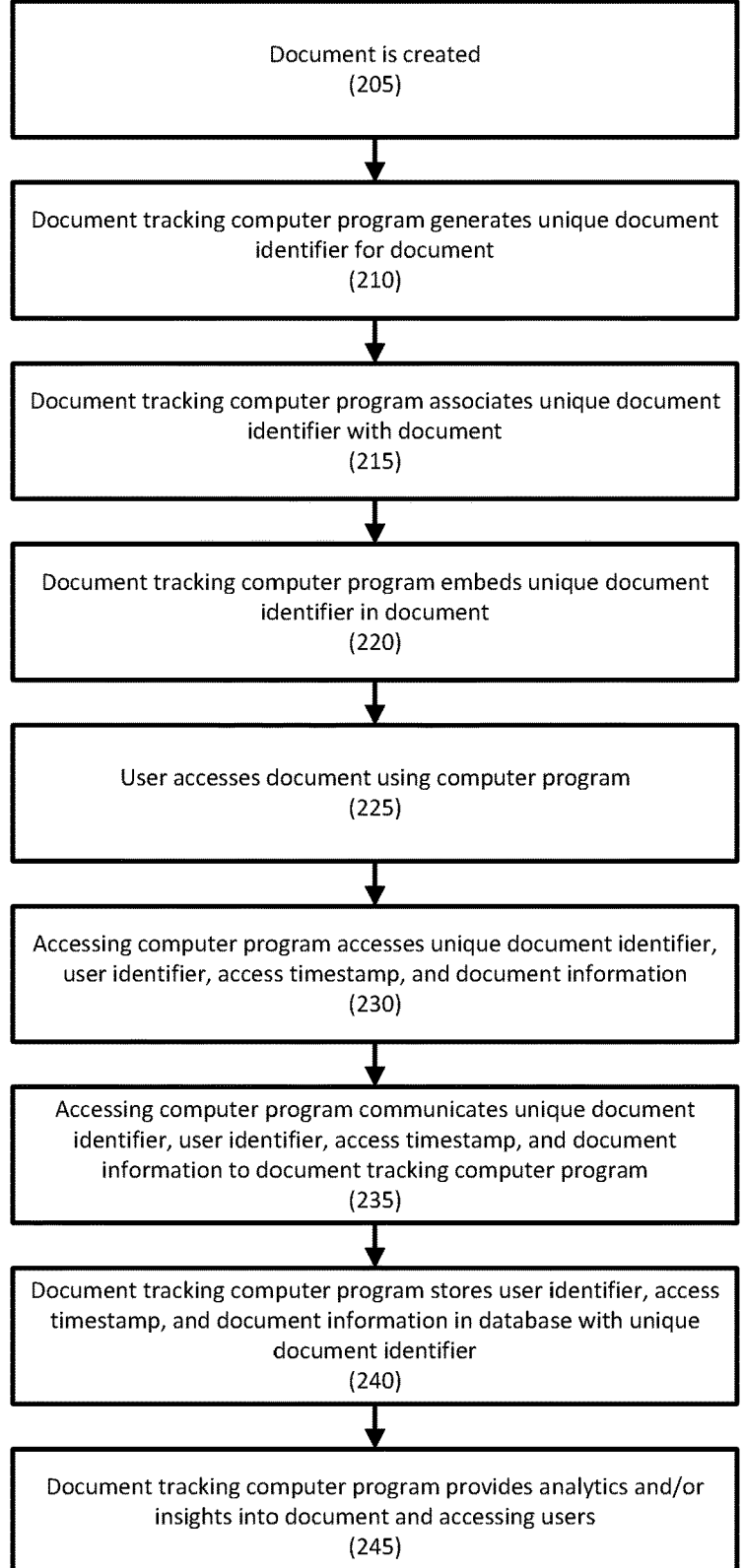
FIG. 2 depicts a method for document tracking according an embodiment.

Referring to FIG. 2, a method for document tracking is disclosed according to an embodiment. In step 205, an electronic document, such as a word processing document, a spreadsheet, a presentation, a photo, a video, an audio file, a computer program, etc.) may be created. In one embodiment, the document may be created by a user using a user electronic device.

In step 210, a document tracking computer program, or an agent for the document tracking computer program executed on a user electronic device, may generate a unique document identifier for the document. In one embodiment, the unique document identifier may a unique alphanumeric value. In another embodiment, the unique document identifier may be based on one or more of source devices (e.g., a unique document identifier for a user device on which the document was created), an identifier for the author of the document, a timestamp associated with the creation, etc. In one embodiment, the unique document identifier may be a hash of one of more of these components.

In one embodiment, the unique document identifier may be encrypted, such as with a public key associated with a document tracking computer program.

In step 215, the document tracking computer program or agent may associate the unique document identifier with the document. In one embodiment, the computer program or agent may store an association of the unique document identifier and the document (e.g., document properties, such as author, title, creation timestamp, number of pages/slides/ sheets, etc.), content tags, the identifier for the electronic device on which it was created, etc.

In step 220, the document tracking computer program or agent may embed the unique document identifier in the document. For example, the unique document identifier may be inserted into a header of the document, or it may be inserted as a digital watermark. Other mechanisms for embedding the unique document identifier in the document may be used as is necessary and/or desired.

In step 225, a user, using a user electronic device, may access a document. The user may access the document from an email program, from local storage, using a document management program, etc. The user may access the document using an accessing computer program, such as a word processing computer program, In step 230, the accessing computer program may retrieve or access the unique document identifier, the user identifier for the user accessing the document, an access timestamp, and document properties (e.g., title, number of pages/slides/sheets, etc.), etc.

In step 235, the accessing computer program may communicate the unique identifier, a user electronic device identifier, the access timestamp, and the document properties to the document tracking computer program.

In step 240, the document tracking computer program may store the information received from the accessing computer program (e.g., the user identifier for the accessing user, the access timestamp, the user electronic device identifier, document properties, etc. in a document access database with the unique document identifier.

In step 245, the document tracking computer program may provide analytics and/or insights into the document and any users that accessed the document. For example, the document tracking computer program may identify changes to a document associated with a unique document identifier as it moves from one user to the next, such as changes in title, changes in the number of pages/slides/sheets, etc., changes in content tags (e.g., additions, subtractions, etc.), etc. It may also identify inefficiencies in editing/revising the document by the users accessing the document.

In one embodiment, the document tracking computer program may use a trained machine learning engine to refine a document editing scheme, such as re-ordering the order in which a document is passed through a chain of users, removing users from the review chain, etc.

In one embodiment, the document tracking computer program may generate reports on users of documents associated with the unique document identifier. For example, the document tracking computer program may identify the users that have accessed the document, the time of access, changes between different documents with the same unique document identifier, etc.

In one embodiment, the document tracking computer program may reconcile the documents having the same unique document identifier to a common document repository, such as cloud storage, a document management control system, etc. In one embodiment, the computer program may replace the local copies of the document with pointers to the document in the common document repository.

In one embodiment, the document tracking computer program may extract information from the document (e.g., author, date/time of creation, etc.) and may use that information to populate fields in the document management system so that the document can be properly indexed. Additional information, such as client information, may be populated if available or discernable.

Figure 3:
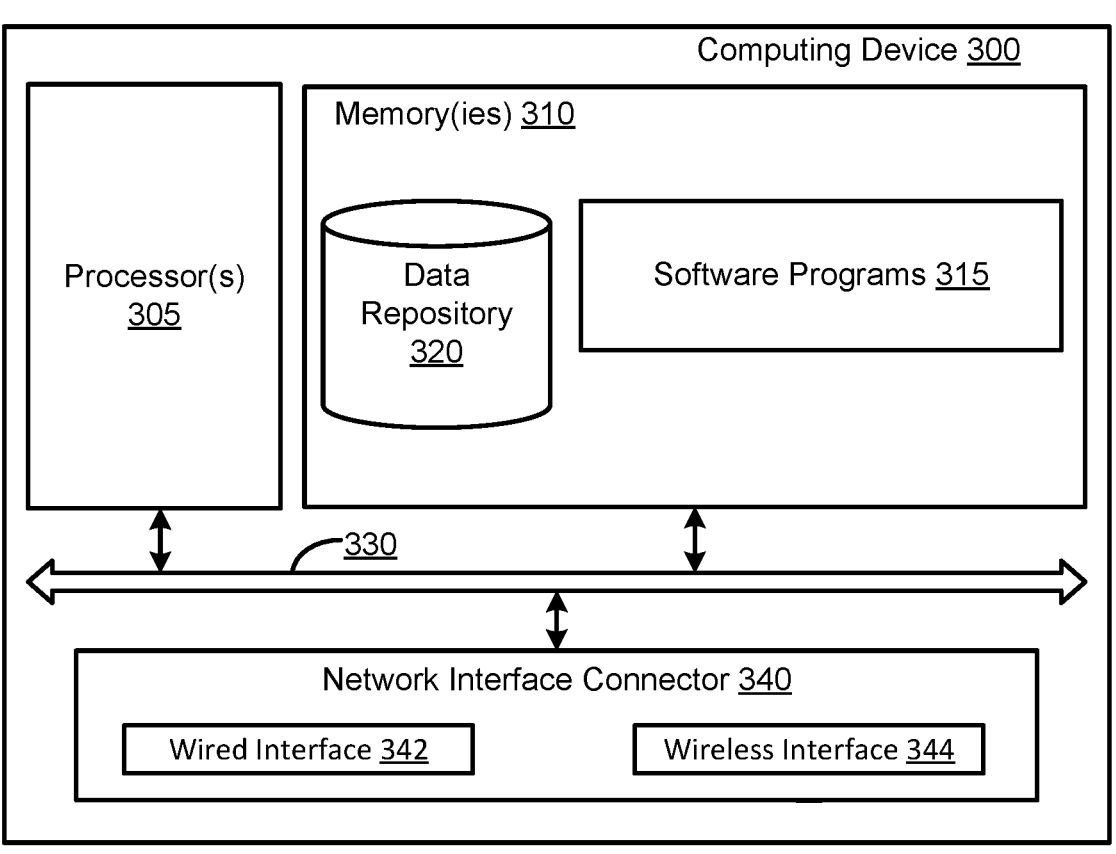
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although multiple embodiments have been disclosed, it should be recognized that these embodiments are not exclusive to each other, and features from one embodiment may be used with other embodiments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user inter-face might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for document tracking, comprising:
generating, by a document tracking computer program, a unique document identifier for the document;
embedding, by the document tracking computer program, the unique document identifier into the document;
storing, by the document tracking computer program an initial document property comprising an initial document title and an initial number of pages or sides in the document with the unique document identifier;
saving, by the document tracking computer program, an association between the unique document identifier and the document;
receiving, from an accessing computer program executed by a user device and by the document tracking computer program, the unique document identifier, an access timestamp, and an updated document property for the document comprising an updated document title and/or an updated number of pages or sides in the document with the unique document identifier; and
storing, by the document tracking computer program, the access timestamp and the updated document property in a document access database.

2. The method of claim 1, wherein the unique document identifier comprises a hash of an identifier for a source electronic device, a user identifier for an author of the document, and/or a document creation timestamp.

3. The method of claim 1, wherein the accessing computer program comprises a word processing program, a presentation computer program, an electronic mail computer program, and/or a spreadsheet computer program.

4. The method of claim 1, wherein the document is stored in local storage of a user electronic device.

5. The method of claim 1, further comprising:
receiving, from a plurality of accessing computer programs in an editing chain for the document and by the document tracking computer program, access timestamps and the initial document property and the updated document property for the unique document identifier; and
identifying, by the document tracking computer program, changes between the initial document property and the updated document property.

6. The method of claim 5, further comprising:
identifying, by the document tracking computer program, an inefficiency in editing chain based on changes.

7. The method of claim 1, further comprising:
identifying, by the document tracking computer program, a plurality of user electronic devices that have accessed local copies of the document with the unique document identifier; and
replacing, by the document tracking computer program, local copies of the document with a pointer to the document in a document repository.

8. The method of claim 1, wherein the accessing computer program comprises a plugin or a script that identifies the unique document identifier in the document and communicates the unique document identifier, the access timestamp, and the document property to the document tracking computer program.

9. A system, comprising:
a plurality of user electronic devices each executing an accessing computer program;
a document access database; and
an electronic device accessing a document tracking computer program that is in communication with the user electronic devices, wherein the document tracking computer program is configured to generate a unique document identifier for a document, to embed the unique document identifier into the document, to store an initial document property comprising an initial document title and an initial number of pages or sides in the document with the unique document identifier, to save an association between the unique document identifier and the document in the document access database, to receive, from one of the accessing computer programs, the unique document identifier, an access timestamp, and an updated document property for the document comprising an updated document title and/or an updated number of pages or sides in the document with the unique document identifier, and to store the access timestamp and the updated document property in the document access database.

10. The system of claim 9, wherein the unique document identifier comprises a hash of an identifier for a source electronic device, a user identifier for an author of the document, and/or a document creation timestamp.

11. The system of claim 9, wherein the accessing computer program comprises a word processing program, a presentation computer program, an electronic mail computer program, and/or a spreadsheet computer program.

12. The system of claim 9, wherein the document is stored in local storage of the user electronic device.

13. The system of claim 9, wherein the document tracking computer program is further configured to receive, from a plurality of accessing computer programs in an editing chain for the document, access timestamps and the initial document property and the updated document property for the unique document identifier, and to identify changes between the initial document property and the updated document property.

14. The system of claim 13, wherein the document tracking computer program is further configured to identify an inefficiency in editing chain based on changes.

15. The system of claim 9, wherein the document tracking computer program is further configured to identify a plurality of user electronic devices that have accessed local copies of the document with the unique document identifier, and to replace local copies of the document with a pointer to the document in a document repository.

16. The system of claim 9, wherein the accessing computer program comprises a plugin or a script that identifies the unique document identifier in the document and communicates the unique document identifier, the access timestamp, and the document property to the document tracking computer program.

\* \* \* \* \*